R. CALHOUN.
WINDOW-SCREEN.
No. 189,080. Patented April 3, 1877.
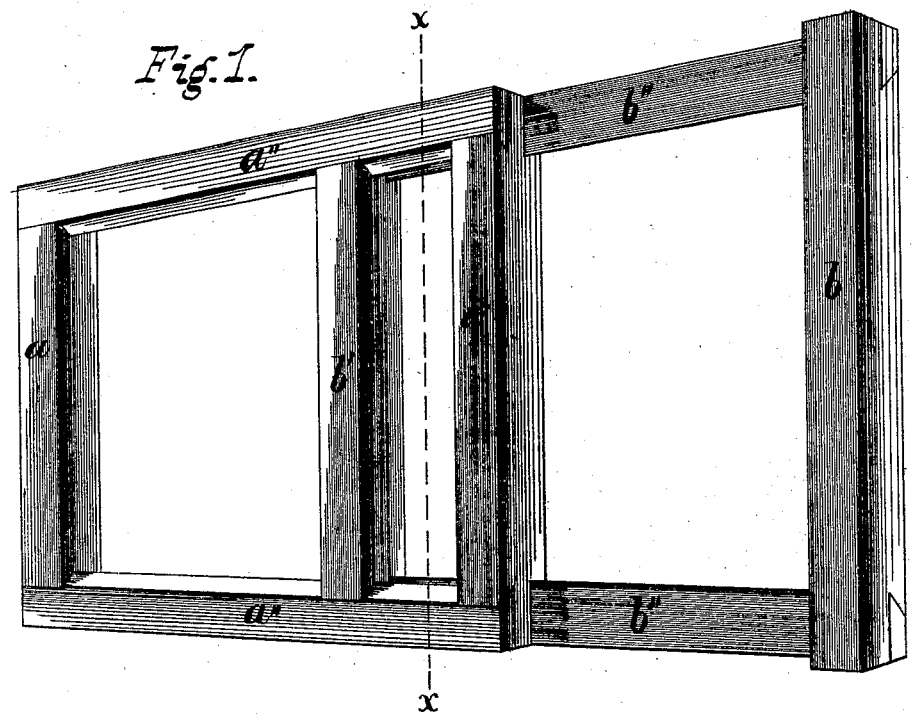
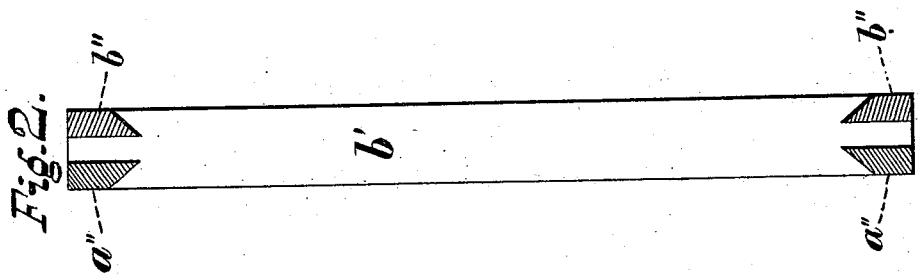

UNITED STATES PATENT OFFICE.

ROBERT CALHOUN, OF ALLEGHENY, ASSIGNOR OF ONE-HALF HIS RIGHT TO PATRICK C. DEAN, OF PITTSBURG, PENNSYLVANIA.

IMPROVEMENT IN WINDOW-SCREENS.

Specification forming part of Letters Patent No. 189,080, dated April 3, 1877; application filed August 16, 1876.

*To all whom it may concern:*

Be it known that I, ROBERT CALHOUN, of Allegheny, in the county of Allegheny and State of Pennsylvania, have invented certain new and useful Improvements in Window-Screens; and I do hereby declare the following to be a full, clear, and exact description of the invention, such as will enable others skilled in the art to which it pertains to make and use it, reference being had to the accompanying drawings, which form part of this specification, in which—

Figure 1 is a perspective of the screen-frame partially extended. Fig. 2 is a section on line $x$ $x$ of Fig. 1.

This invention relates to window-screens of that class which are adjustable to window-frames of various widths; and consists in the construction and combination of the parts of the screen-frames, as hereinafter fully described and claimed.

The frame consists of two parts, one made up of the end bars $a$ $a'$ and top and bottom strips $a''$ $a''$, and the other made up of end bars $b$ $b'$ and top and bottom strips $b''$ $b''$. The top and bottom strips of both frames are all of the same form exactly, as seen in Fig. 2, having one edge beveled, as shown. The end bars are made with a transverse dovetail at each end, the bars $a'$ and $b'$ being dovetailed on both faces, and the bars $a$ and $b$ only on one face. Referring to Fig. 2, this will be understood.

The bars $a'$ and $b'$ are dovetailed on both faces and both ends. Bar $a$ is dovetailed at both ends, but only on one face to receive the strips $a''$. Bar $b$ is similarly but oppositely cut to receive only the strips $b''$.

The parts being all ready, the frame is put together as follows: The four bars $a$ $b'$ $a'$ $b$ are laid down just as they appear in Fig. 1. Then strips $a''$ are laid in the dovetails of bars $a$ $b'$ $a'$, but fastened, by nailing or otherwise, only to the bars $a$ $a'$. This leaves the bar $b'$ free to move from side to side in the frame $a$ $a'$ $a''$; but prevents its removal or movement in any other direction. Then the four bars are turned upside down and the strips $b''$ laid in the dovetails in the bars $b$ $a'$ $b'$, but fastening only to bars $b$ and $b'$, leaving the bar $a'$ free as relates to strips $b''$.

All that remains to do is to tack on the wire-gauze or other netting, and the screen is complete. The wire is put on the outside opposite faces of the two parts of the frame.

Thus constructed the frame is firm and yet easily operated, does not wabble in adjusting, the beveled strips forming a perfect guide to and fro, while the top and bottom edges are necessarily in a true plane, leaving no openings or cracks anywhere for the entrance of insects.

The construction of the frames allows them to close up into the space of one, to be packed for transportation, and the two inside bars being accurately fitted to the top and bottom strips form a strong brace to resist pressure and help the strips to keep the netting taut and smooth. Its simplicity renders it impossible to get out of order.

The parts being almost all exact duplicates, no trouble is experienced in fitting, as nothing is required but to saw off the proper lengths and join together.

A great advantage lies in the fact that the outside bars of both frames are jointed in regular framing style. This makes them much stronger than if simply nailed across one another, as in some of the frames in use. Consequently my frame is durable and strong to an eminent degree.

Other styles of matching the strips may be used—for instance, the common tongue and groove—but I prefer the bevel and dovetail, as being in my opinion the strongest and most cheaply constructed.

The frame-work is cheap, having nothing but the actual parts necessary to fasten the netting to.

No guiding-rods are needed, as the method of joining makes a perfect guide by which the frames slide from side to side.

Having thus described my invention, what I claim is as follows:

In an adjustable window-screen, composed of the two sliding sections having each its inner upright bar $a'$ $b'$, respectively, tenoned and dovetailed, as shown, the beveled bars $a''$ $b''$, one of which is secured to each bar $a'$ $b'$, and separated from the other by the tenon or tongue, as shown, and for the purpose set forth.

In testimony that I claim the foregoing I have hereunto set my hand this 5th day of August, 1876.

ROBERT CALHOUN.

Witnesses:
 THOS. J. MCTIGHE,
 SAML. ANDERSON.